United States Patent [19]

Yoshigai

[11] Patent Number: 5,528,954
[45] Date of Patent: Jun. 25, 1996

[54] OPERATING LEVER DEVICES

[75] Inventor: Kenichi Yoshigai, Higashi-Osaka, Japan

[73] Assignee: Yoshigai Kikai Kinzoku Co., Ltd., Japan

[21] Appl. No.: 276,459

[22] Filed: Jul. 18, 1994

[30] Foreign Application Priority Data

Jul. 23, 1993 [JP] Japan .................................. 5-182954

[51] Int. Cl.⁶ ............................. B62K 23/06; B62L 3/02
[52] U.S. Cl. ............................ 74/489; 74/502.2; 74/516; 74/522
[58] Field of Search ......................... 74/489, 516, 502.2, 74/522; 188/24.14, 24.15, 24.22

[56] References Cited

U.S. PATENT DOCUMENTS

| | | | |
|---|---|---|---|
| 4,533,276 | 8/1985 | Stidham | 74/502.2 X |
| 4,850,241 | 7/1989 | Buckley et al. | 74/502.2 |
| 4,899,610 | 2/1990 | Bourret | 74/489 |
| 5,065,643 | 11/1991 | Axtell | 74/523 X |
| 5,279,179 | 1/1994 | Yoshigai | 74/502.2 |
| 5,448,927 | 9/1995 | Lumpkin | 74/502.2 |

FOREIGN PATENT DOCUMENTS

| | | | |
|---|---|---|---|
| 435248A | 7/1991 | European Pat. Off. | 74/502.2 |
| 0593842 | 4/1994 | European Pat. Off. | |
| 996160 | 12/1902 | France | |
| 960276 | 4/1950 | France | |
| 3713100A | 11/1988 | Germany | 74/489 |
| 57-06454A | 12/1983 | Japan | 74/489 |
| 3292280 | 12/1991 | Japan | |
| 248133 | 9/1947 | Switzerland | 74/502.2 |
| 723953 | 2/1955 | United Kingdom | |
| 744320 | 2/1956 | United Kingdom | 74/489 |

Primary Examiner—Charles A. Marmor
Assistant Examiner—Troy E. Grabow
Attorney, Agent, or Firm—Sixbey, Friedman, Leedom & Ferguson; David S. Safran

[57] ABSTRACT

An operating lever device of the present invention includes housing 3, an operating lever 5 pivotably mounted on the housing 3 by a first support shaft 4, a first link 7 pivotably mounted on the operating lever 5 by a second support shaft 6, an operating cable 8 connected to an end portion of the first link 7 and extending outwardly through the housing 3, and means 9 for restraining the pivotal movement of the first link 7 in a manner that when the operating lever 5 is operated the end portion of the first link 7 may approach the first support shaft 4.

7 Claims, 9 Drawing Sheets

OPERATING LEVER DEVICES

FIELD OF THE INVENTION AND RELATED ART STATEMENT

The present invention relates to an operating lever device to be used mainly as a brake operating device for bicycles.

An operating lever device of this type which is for example described in Unexamined Japanese Patent Publication Hei 3-292280 is known.

The conventional lever device is so constructed as to pull an operating cable connected to an operating lever when the operating lever is operated. A power transmission ratio adjusting mechanism is provided between the operating lever and the operating cable. Herein the "power transmission ratio" is defined as a value given by dividing an output produced on the side of the operating cable by a unit input applied to the operating lever.

The conventional power transmission ratio adjusting mechanism includes an operating lever pivotally supported on a bracket by a support shaft, a slotted hole provided in the operating lever, a cam groove provided in the bracket, a cam follower engaging with the slotted hole and the cam groove, and a cable connector connected to the cam follower.

It is so constructed that, when the operating lever is rotated about the support shaft, the cam follower moves between the slotted hole and the cam groove and thereby changing a distance between the cable connector and the support shaft, thus altering the power transmission ratio.

In other words, with the conventional power transmission ratio adjusting mechanism, the cam follower provided at the cable connector is fitted in the slotted hole formed with the operating lever and in the cam groove formed with a housing, and therefore a frictional resistance excessively increases and the operating lever requires a greater power to be operated, thereby resulting in heavy lever operation.

Since the operating lever is rotated with its support shaft being as a support point while the cable connector pulls the operating cable by rotation of the operating lever, only fitting the cam follower in the slotted hole formed with the operating lever results in a loss of cable pulling force and it has been difficult to form a precision cam groove so as to prevent the pull loss.

Design of the cam groove for obtaining a predetermined power transmission ratio has required complicated computation and has been very difficult to be performed. With the cam groove thus obtained, the power transmission ratio is singly determined, allowing no arbitrary adjustment.

That is, because of a difference in an operating power between a male and a female or between an adult and a child, it is desired that the power transmission ratio be adjustable to an adequate value correspondingly. It is also desired that the power transmission ratio be changeable between a bicycle for general roads and an off-road bicycle, but once the design of the bicycle is decided, it is impossible to adjust the power transmission ratio.

OBJECT AND SUMMARY OF THE INVENTION

It is, therefore, an object of the present invention to provide an operating lever device which ensures light and smooth brake operation with little pull loss, and enables adjustment of power transmission ratio in an actual bicycle.

To attain the object stated above, the present invention has taken the following measures.

In other words, the present invention includes a housing, an operating lever pivotably mounted on the housing by a first support shaft, a first link pivotably mounted on the operating lever by a second support shaft, an operating cable connected to an end portion of the first link and extending outwardly through the housing, and means for restraining the pivotal movement of the first link in a manner that when the operating lever is operated the end portion of the first link 7 may approach the first support shaft.

The restraining means can be constituted of a second link pivotably mounted on the first link by a third support shaft and on the housing by a fourth support shaft. It is preferable that the mounting position of the fourth support shaft be adjustable.

The restraining means can be constructed by a cam mechanism provided between the housing and the first link.

It is advisable that the cam mechanism be constituted of a cam roller provided on the housing and a cam surface provided on the first link, the cam surface being contactable on the cam roller.

In order to attain the above object, the mounting position of the cam roller should be made adjustable.

According to the present invention, the operating lever is pivoted about the first support shaft and thereby the operating cable being pulled by the first link, thus actuating the braking device connected to the operating cable, for instance.

At this time, the moment about the first support shaft relative to the operating power exerted to the operating lever is balanced with that relative to a tension exerted on the operating cable.

When the operating lever is pivoted, as the end portion of the first link is restrained by the restraining means in a manner to approach the first support shaft, the distance between the operating cable and the first support shaft is decreased, thereby reducing the length of the arm of the operating cable moment about the first support shaft and increasing the tension of the operating cable correspondingly.

At this time, as the movement of the first link is restrained by the restraining means which comprises the link mechanism and the cam mechanism, the first link can move smoother than the conventional one moving within a cam groove, thus ensuring light and smooth brake operation without a power loss.

Additionally, changing the position of the cam roller and the fourth support alters the pivoting track of the first link, whereby the power transmission ratio is changed.

According to the present invention, the operating lever device is not provided with such a cam groove as is conventionally used, but has a link mechanically pivoted with the operating lever, which makes it possible to operate the braking device with little frictional resistance and lightly without a power loss. It is also possible to carry out fine adjustment of a braking force while braking the bicycle powerfully even with a little operating force.

BRIEF DESCRIPTION OF THE DRAWINGS

FIG. 14 is a graph showing a relation between the angle of rotation of the operating lever and the output produced at the operating cable in the fourth embodiment.

DETAILED DESCRIPTION OF THE PREFERRED EMBODIMENTS

Hereinafter preferred embodiments of an operating lever device according to the present invention will be explained with reference to the accompanying drawings.

Figure 1:
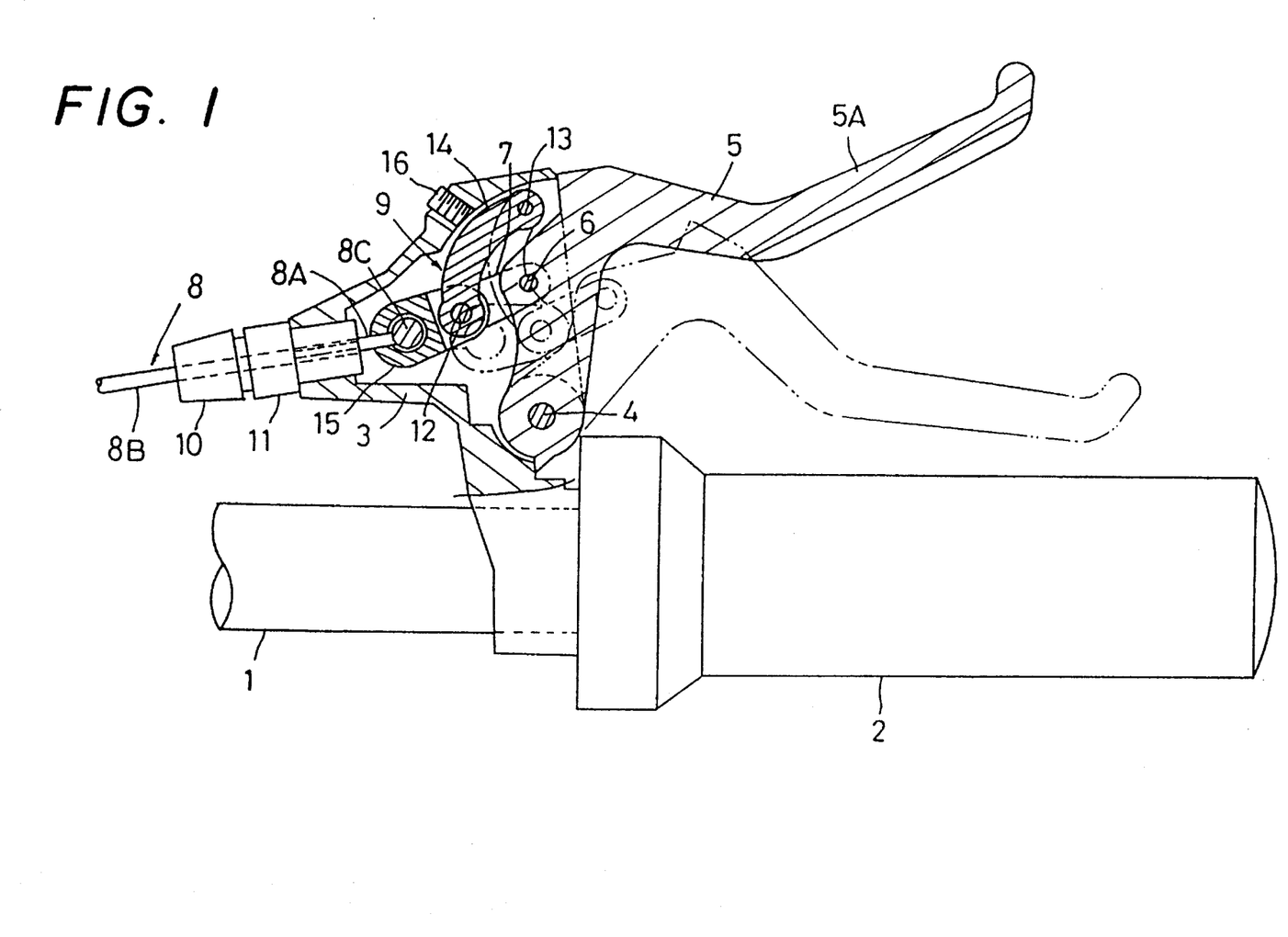
FIG. 1 is a partially-cut side view showing a first embodiment of an operating lever device according to this invention.

In FIG. 1, the operating lever device of the present invention is illustrated as used for operating a bicycle brake. This operating lever device has a housing 3 removably mounted in the proximity of a grip 2 of a handlebar 1 of a bicycle, an operating lever 5 pivotably mounted on the housing 3 by a first support shaft 4, a first link 7 pivotably mounted on the operating lever 5 by a second support shaft 6, an operating cable 8 connected to an end portion of the first link 7 and extending outwardly through the housing 3, and means 9 for restraining the pivotal movement of the first link 7 in a manner that when the operating lever 5 is operated the end portion of the first link 7 may approach the first support shaft 4.

The housing 3 is a box type made of an aluminum alloy or the like, whose rear surface is made as an opening portion which is open rearwardly, on which a base portion of the operating lever 5 is insertably removably mounted. The housing 3 has a front upper portion served as a mounting portion for mounting the operating cable 8. An adjusting bolt 10 is screwed into the mounting portion and a lock nut 11 is screwed into the adjusting bolt 10.

The operating cable 8 includes an inner cable 8A and an outer tube 8B covering the inner cable 8A. A nipple 8C is fixed on the end portion of the inner cable 8A. The outer tube 8B is insertedly supported through he adjusting bolt 10. Adjusting the adjusting bolt 10 enables the length of exposed portion of the inner cable 8A relative to the outer tube 8B to be adjusted.

A braking device provided at the wheel side (not shown) is connected to the other end of the inner cable 8A.

The operating lever 5 has a base portion pivotally supported on the first support shaft 4 which is fixed on the housing 3, and an operating portion 5A extending from the base portion to the side of the grip 2, in which the base portion is formed with a narrow-width portion of the operating lever 5 so that it may be inserted into the opening portion of the housing 3.

The first support shaft 4 is provided with a return spring (not shown) biasing the operating lever 5 toward the starting end of movement.

The second support shaft 6 is provided in parallel with the first support shaft 4 with the narrow-width portion of the base portion of the operating lever 5 in a position which is away from the first support shaft 4 by a predetermined distance. Opposite ends of the second support shaft 6 project out of the narrow-width portion of the operating lever 5 respectively, on whose projecting portions a pair of the first links 7 are pivotably supported.

The restraining means 9 comprises a second link 14 rotatably supported at its opposite ends by the third support shaft 12 provided on the end portion of the first link 7 and the fourth support shaft 13 provided on the housing 3. The second link 14 is arranged between the pair of first links 7. The third and fourth support shafts 12 and 13 are provided in parallel with the first support shaft 4, wherein the first, second and fourth support shafts 4, 6 and 13 are disposed generally on the same alignment respectively.

Bifurcated portions of the cable connector 15 are pivotally supported at opposite ends of the third support shaft 12. The nipple 8C of the inner cable 8A is insertably engaged with the cable connector 15.

An adjusting bolt 16 is screwed into the portion of the housing 3 facing the second link 14. The starting end position of operation of the operating lever 5 is adjustable by rotating the adjusting bolt 16 at the tip thereof so as to be in contact with the second link 14.

According to the embodiment mentioned above, when the operating lever 5 is rotated about the first support shaft 4, the inner cable 8A is pulled through the first link 7 and the cable connector 15, whereby the braking device is driven (not shown). At this time, since the third support shaft 12 at the end portion of the first link 7 is restrained by the second link 14 of the restraining means 9, the third support shaft 12 moves around a circular arc centering about the fourth support shaft 13, as shown.

That is, as the third support shaft 12 moves to approach the first support shaft 4, the power transmission ratio differs at each of operating positions of the operating lever 5. This embodiment uses no sliding mechanism as conventional wherein the operating lever slides in a slotted hole or in a cam groove, but adopts a simple link mechanism wherein the end portion of the first link 7 is caused to approach the first support shaft 4, whereby the operating lever can move smoothly without a pull loss.

Figure 2:
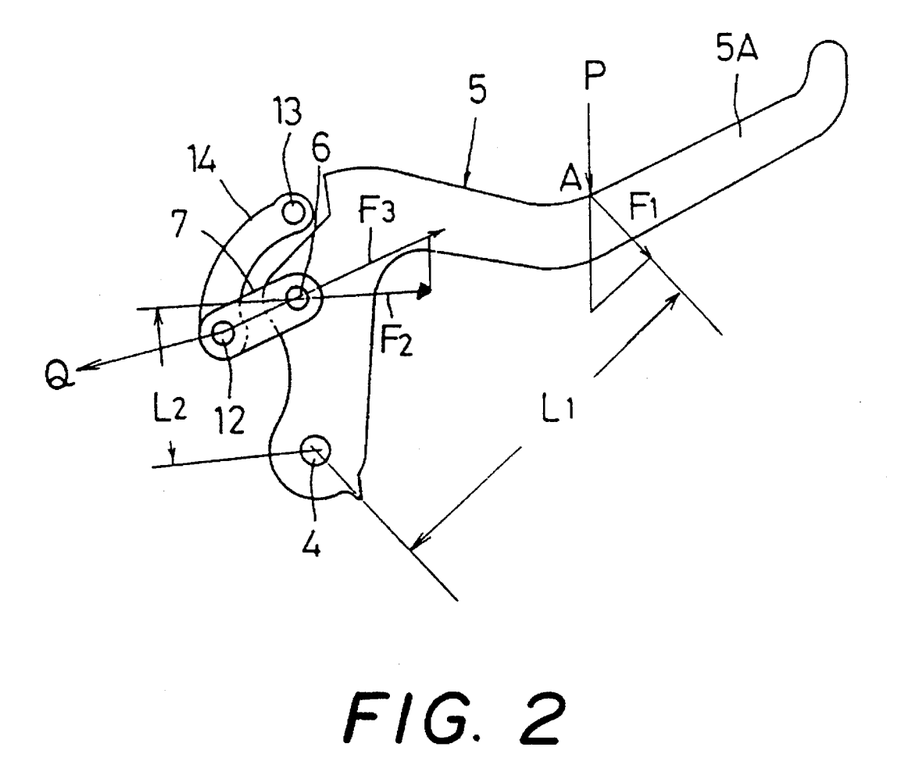
FIG. 2 is a side view for explaining reference characters used in formulas.

Next, relations of brake operating forces in the embodiment described above will be explained by referring to FIG. 2. Definitions of reference characters used in FIG. 2 are as follows.

P: Input acting on the force applied point A of the operating lever 5.

F1: Component force of the input P intersecting at a right angle therewith a line connecting the first support shaft 4 with the point A.

F2: Force intersecting at a right angle therewith a line connecting the first support shaft 4 with the second shaft 6.

F3: Force along a line connecting the second support shaft 6 with the third support shaft 12.

Q: Output along the inner cable 8A.

L1: Distance from the first support shaft 4 to the force applied point A.

L2: Distance between the first support shaft 4 and the second support shaft a°: Angle of the line connecting the first support shaft 4 with the force applied point A relative to the handlebar 1.

b°: Angle of the line connecting the first support shaft 4 with the second support shaft 6 relative to the handlebar 1.

c°: Angle of the line connecting the second support shaft 6 with the third support shaft 12 relative to the handlebar 1.

d°: Angle of the line connecting the third support shaft 12 with the fourth support shaft 13 relative to the handlebar 1.

e°: Angle of the inner cable 8A relative to the handlebar 1.

The relations between the forces stated above are as follows.

Figure 3:
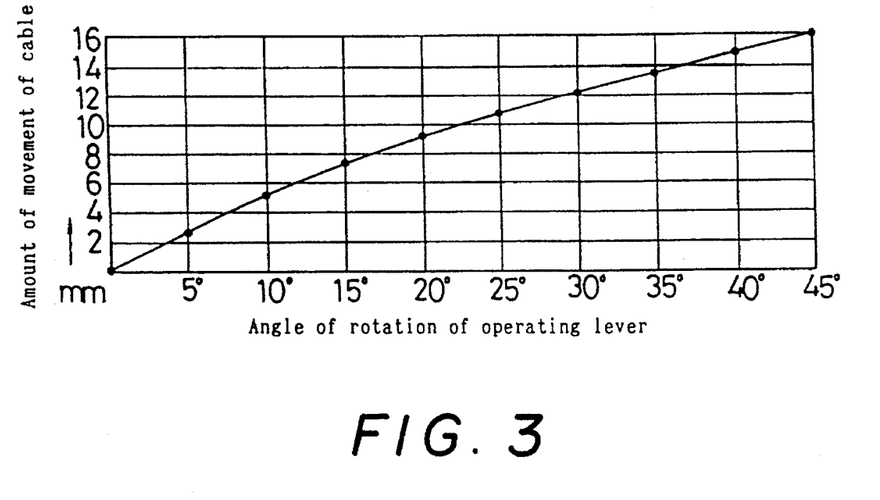
FIG. 3 is a graph showing a relation between the angle of rotation of an operating lever and the amount of movement of an operating cable in the first embodiment.

$F1 = P \cdot \cos a$ $F2 = F1 \cdot L1/L2$ $F3 = F2 \cdot \operatorname{cosec}(c+90-b)$ $Q = F3 \cdot \{\cos(c-e) - \sin(c-e) \cdot \tan(e+90-d)\}$ FIG. 3 gives a graph showing the amount of movement of the inner cable 8A relative to the angle of rotation of the operating lever 5 (a value after subtraction of a current angle "a" from the initial value of the angle "a").

Figure 4:
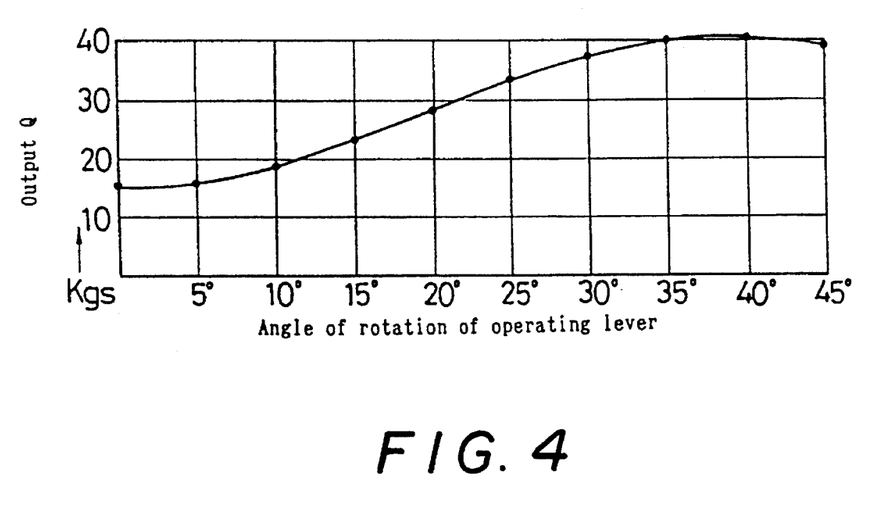
FIG. 4 is a graph showing a relation between the angle of rotation of the operating lever and an output produced at the operating cable in the first embodiment.

FIG. 4 gives a graph showing the relation of an output Q along the inner cable 8A relative to the angle of rotation of the operating lever 5. The output Q in FIG. 4 is given by calculation in the case of L1=60 mm, L2=24.25 mm and P=10 kg.

Figure 5:
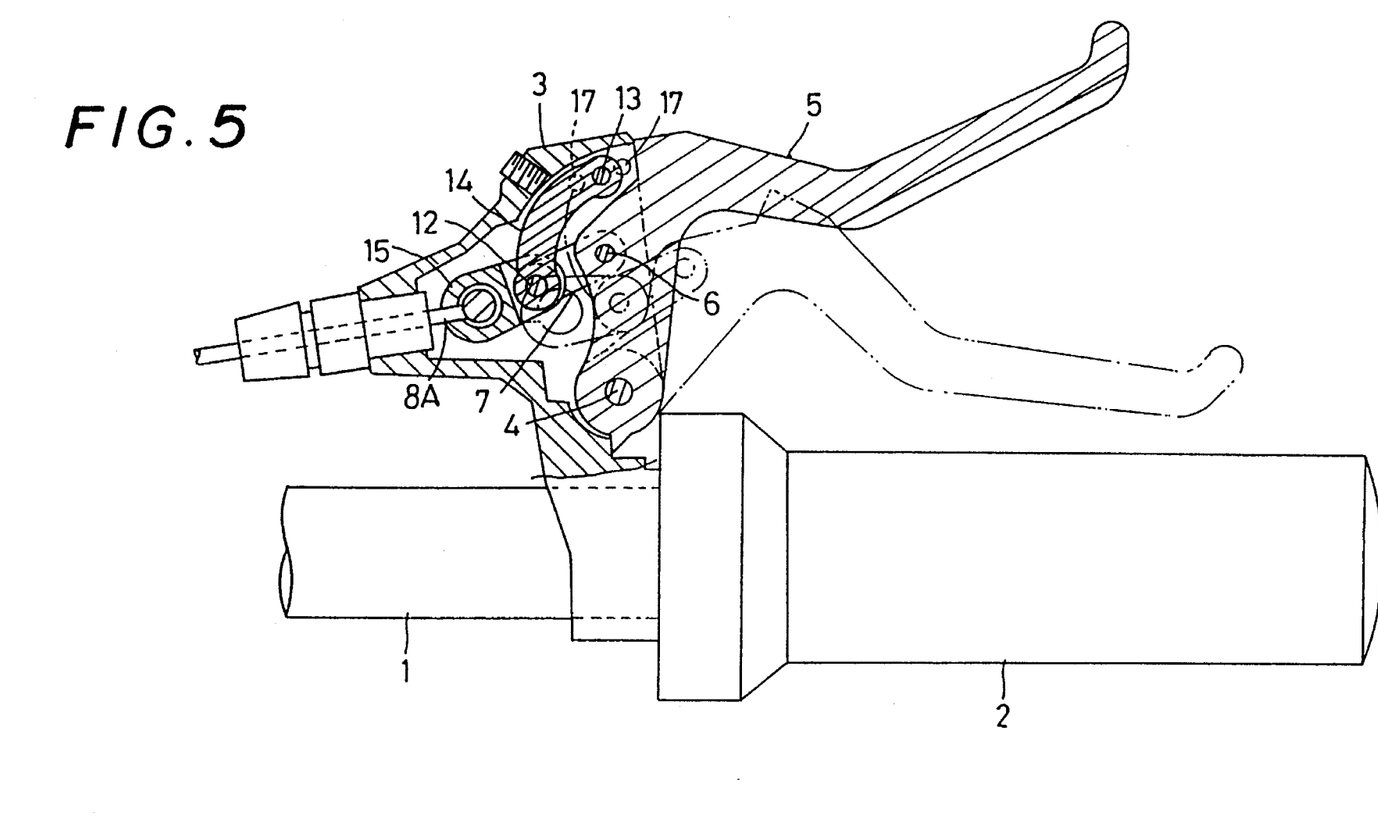
FIG. 5 is a partially-cut side view showing a second embodiment of the invention.

FIG. 5 shows the second embodiment of the present invention, wherein the difference with the first embodiment resides in that the position of the fourth support shaft 13 is adjustable.

Namely, a plurality of insertion holes 17 for support shafts are formed with opposite side walls of the housing 3 and the fourth support shaft 13 is inserted in any one of the insertion holes 17.

Figure 6:
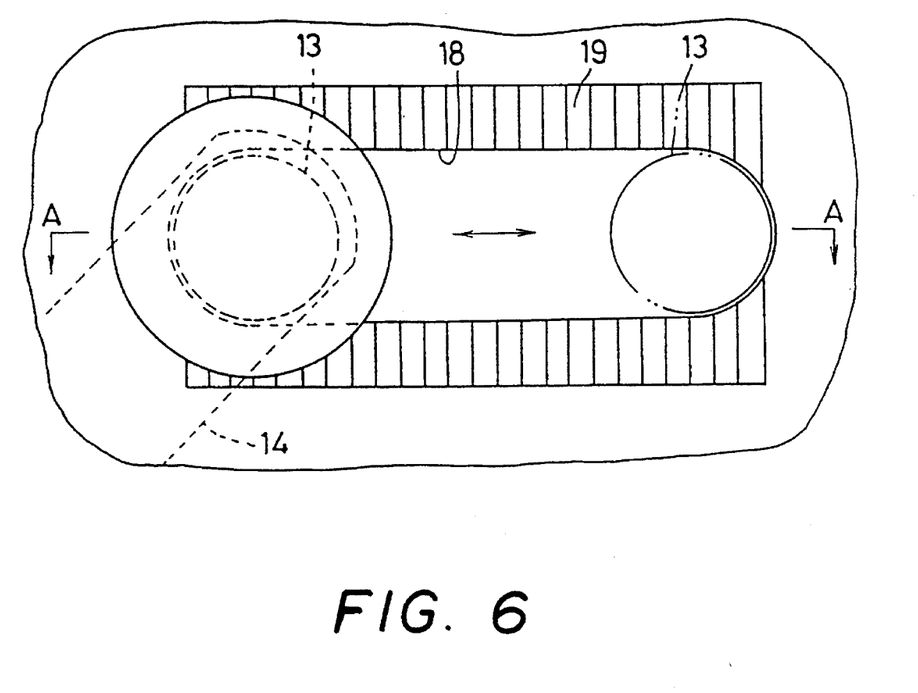
FIG. 6 is a side view showing a major portion of a third embodiment of the invention.
Figure 7:
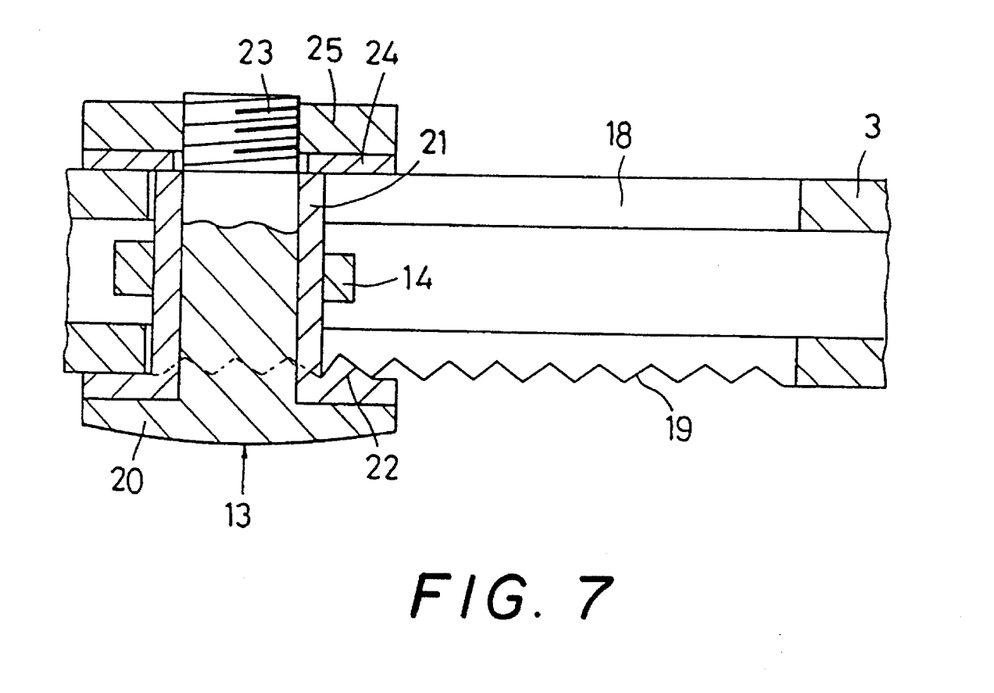
FIG. 7 is a sectional view taken along line A—A of FIG. 6.

FIGS. 6 and 7 show the third embodiment of the present invention, wherein the difference with the second embodiment lies in that a successive slotted hole 18 is formed in place of a plurality of insertion holes 17.

That is, the slotted holes 18 having sawtooth-like engaging projections 19 on the edge thereof are formed with opposite side walls of the housing 3, the fourth support shaft 13 with a head 20 is inserted in the slotted holes 18 by a synthetic-resin bush 21, an engaged portion 22 removably engaged with the engaging portion 19 is formed with the flange of the bush 21, and a nut 25 is fastened to a threaded portion 23 of the fourth support shaft 13 by a synthetic-resin plain washer 24. In this embodiment, the second link 14 is rotatably supported by the bush 21.

Accordingly, the nut 25 is loosened to disengage the engaging projection 19 with the engaged portion 22 and the third support shaft 13 is slid along the slotted hole 18 with the bush 21, whereby the position of the fourth support shaft 13 is changed, and re-fastening of the nut 25 causes the fourth support shaft 13 to be fixed.

Figure 8:
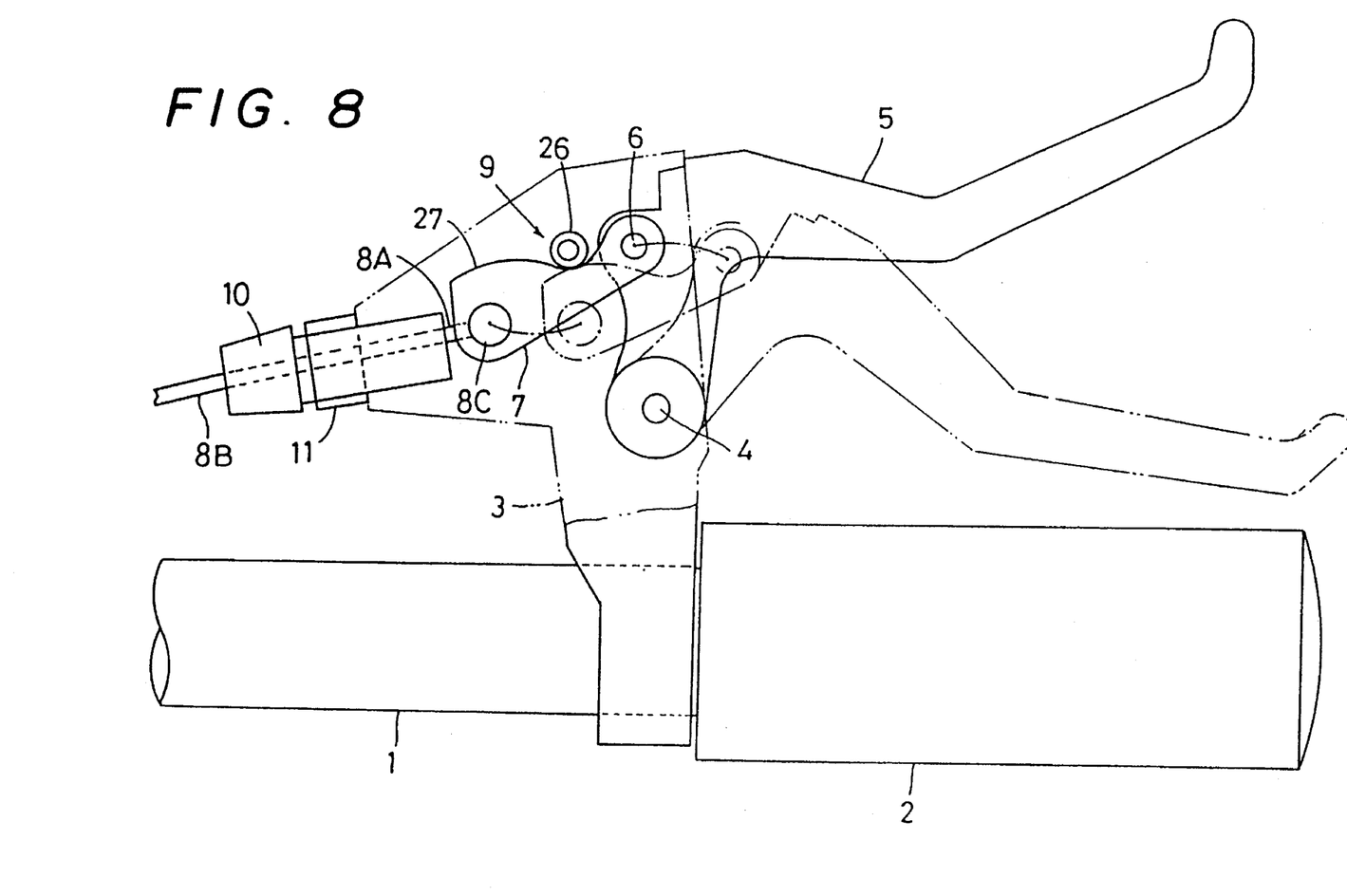
FIG. 8 is a partially-cut side view showing a fourth embodiment of the invention.

FIG. 8 shows the fourth embodiment of the present invention, in which the difference with the first embodiment exists in the constitution of the restraining means 9.

In other words, in the fourth embodiment, the restraining means 9 comprises a cam mechanism provided between the housing 3 and the first link 7. The cam mechanism comprises a cam roller 26 provided on the housing 3 and a cam surface 27 provided on the first link 7 to be in contact with the cam roller 26.

The cam surface 27 provided on the first link 7 is formed in a manner that the end portion of the first link 7 approaches the first support shaft 4 when the operating lever 5 is operated. The nipple 8C of the inner cable 8A is removably connected to the end portion of the first link 7.

Figure 9:
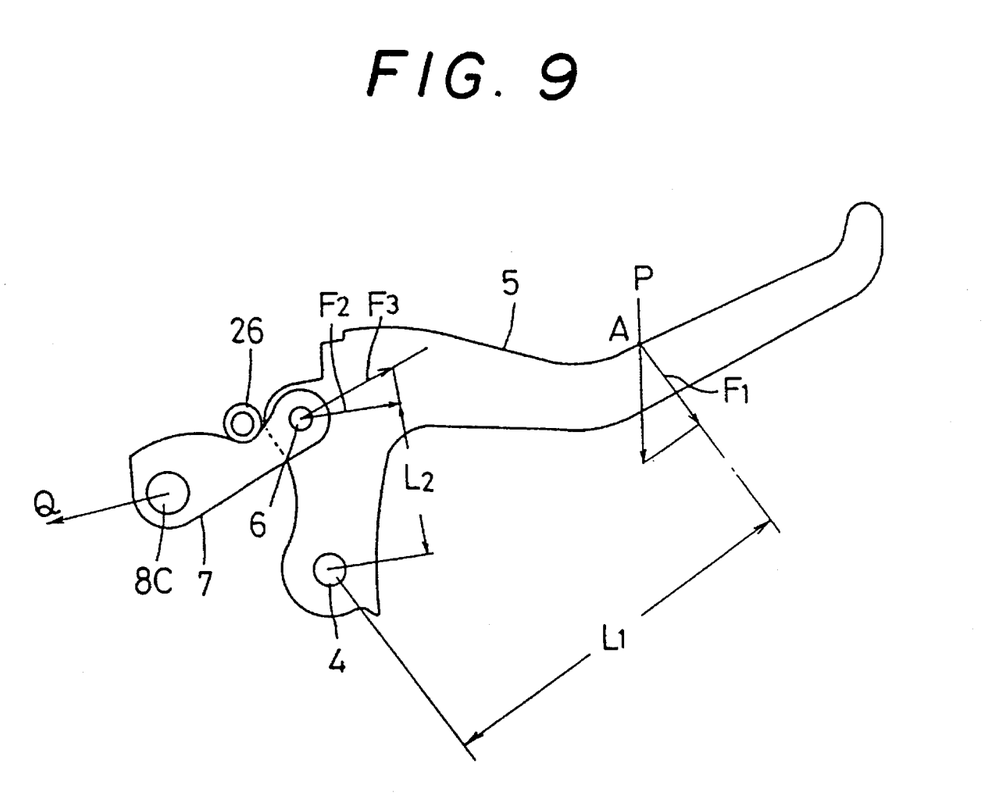
FIG. 9 is a side view for explaining reference characters used in formulas in the fourth embodiment.

FIG. 9 shows reference characters for applying the fourth embodiment to the formulas noted above.

Figure 10:
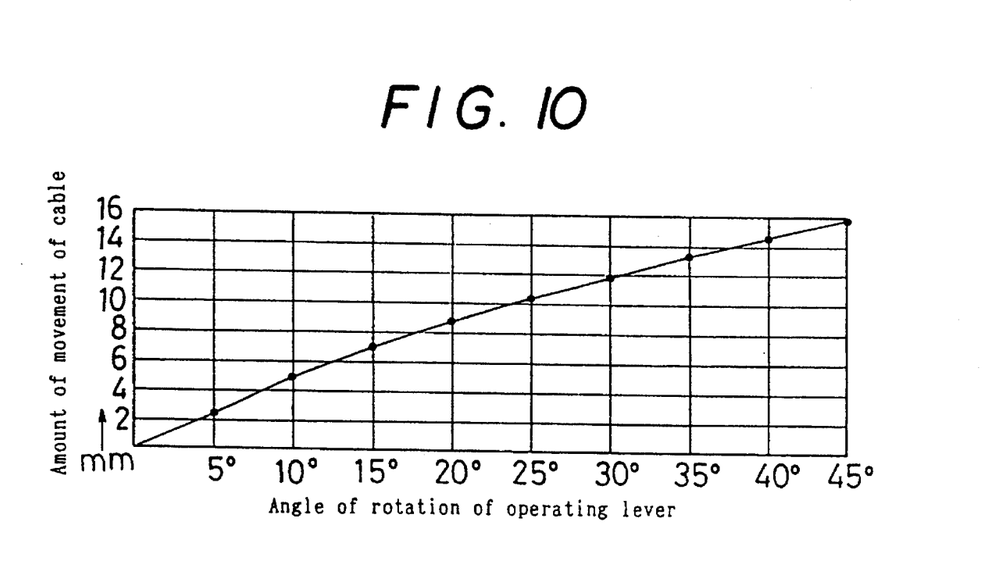
FIG. 10 is a graph showing a relation between the angle of rotation of the operating lever and the amount of movement of the operating cable in the fourth embodiment.

FIG. 10 is a graph showing the amount of movement of the inner cable 8A relative to the angle of rotation of the operating lever 5 in the fourth embodiment.

Figure 11:
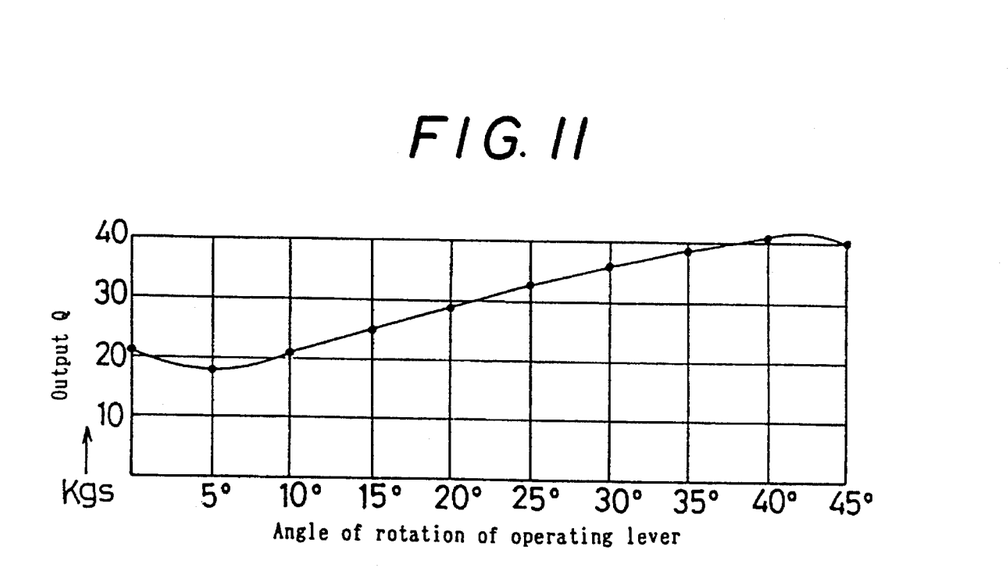

FIG. 11 is a graph showing the relationship of the output Q along the inner cable 8A relative to the angle of rotation of the operating lever 5 in the fourth embodiment. The output Q in FIG. 11 is given by calculation in the case of L1=60 mm, L2=24.25 mm, and P=10 kg.

The power transmission ratio, not shown, can be changed by making the mounting position of the cam roller 26 adjustable as is the same in FIGS. 5 to 7.

The preferred embodiments described in the present specification are illustrative, not limited thereto. The scope of the invention is indicated by the appended claims, and every and any modification as recited in the claims are included in the invention.

What is claimed is:

1. A bicycle brake operating lever device comprising:

a housing;

a brake operating lever and mounting means for pivotably mounting the brake operating lever to said housing in a manner producing a smooth movement and a power transmission ratio that varies with movement of the brake operating lever; wherein said mounting means comprises:

a first support shaft pivotably mounting said brake operating lever on said housing;

a first link pivotably mounted on said brake operating lever by a second support shaft;

a brake operating cable connected to an end portion of said first link and extending outwardly through said housing; and means for restraining the pivotal movement of said first link in a manner that, when said operating lever is operated, said end portion of said first link may approach said first support shaft;

wherein said restraining means comprises a second link that is pivotably mounted on said first link by a third support shaft and is pivotably mounted on said housing by a fourth support shaft.

2. A bicycle brake operating lever device as defined in claim 1, wherein the mounting position of said fourth support shaft is adjustable.

3. A bicycle brake operating lever device comprising:

a housing;

an operating lever pivotably mounted on said housing by a first support shaft;

first link pivotably mounted on said operating lever by a second support shaft;

an operating cable connected to an end portion of said first link and extending outwardly through said housing; and means for restraining the pivotal movement of said first link in a manner that, when said operating lever is operated, said end portion of said first link may approach said first support shaft; wherein said restraining means comprises a cam mechanism provided between said housing and said first link; and wherein said cam mechanism comprises a cam roller provided on said housing and a cam surface provided on said first link said cam surface being contactable on said cam roller.

4. A bicycle brake operating lever device as defined in claim 3, wherein the mounting position of said cam roller is adjustable.

5. An operating lever device of a brake operating device for a bicycle comprising:

a housing mounted on a handlebar;

a brake operating lever and mounting means for pivotably mounting the brake operating lever to said housing in a manner producing a smooth movement and a power transmission ratio that varies with movement of the brake operating lever; wherein said mounting means comprises:

a first support shaft pivotably mounting said brake operating lever on said housing by a first support shaft which is proximal said handlebar;

a first link pivotably mounted on said operating lever by a second support shaft which is opposite to said handlebar relative to said first support shaft;

a brake operating cable connected to an end portion of said first link and extending outwardly through said housing; and means for restraining the pivotal movement of said first link in a manner that, when said brake operating lever is operated, said end portion of said first link may approach said first support shaft, wherein said restraining means comprises a second link pivotably mounted on said first link by a third support shaft and pivotably mounted on said housing by a fourth support shaft.

6. An operating lever device as defined in claim 5 wherein said first support shaft, second support shaft and fourth support shaft are arranged in this order from said handlebar, and a cable connector is connected to said third support shaft and said brake operating cable.

7. An operating lever device of a brake operating device for a bicycle comprising:

a housing mounted on a handlebar;

a brake operating lever pivotably mounted on said housing by a first support shaft which is proximal said handlebar;

a first link pivotably mounted on said operating lever by a second support shaft which is opposite to said handlebar relative to said first support shaft;

a brake operating cable connected to an end portion of said first link and extending outwardly through said housing; and means for restraining the pivotal movement of said first link in a manner that, when said brake operating lever is operated, said end portion of said first link may approach said first support shaft; wherein said restraining means comprises a cam mechanism provided between said housing and said first link, said cam mechanism comprises a cam roller provided on said housing and a cam surface provided on said first link, said cam surface being contactable on said cam roller, the mounting position of said cam roller is adjustable, and the mounting position of said fourth support shaft is adjustable.

* * * * *